(12) United States Patent
Sheth et al.

(10) Patent No.: US 10,955,251 B2
(45) Date of Patent: Mar. 23, 2021

(54) IDENTIFYING INCORRECT COORDINATE PREDICTION USING ROUTE INFORMATION

(71) Applicant: Uber Technologies, Inc., San Francisco, CA (US)

(72) Inventors: Chandan Prakash Sheth, Fremont, CA (US); Sheng Yang, Fremont, CA (US)

(73) Assignee: Uber Technologies, Inc., San Francisco, CA (US)

(*) Notice: Subject to any disclaimer, the term of this patent is extended or adjusted under 35 U.S.C. 154(b) by 199 days.

(21) Appl. No.: 16/123,656

(22) Filed: Sep. 6, 2018

(65) Prior Publication Data

US 2020/0080852 A1 Mar. 12, 2020

(51) Int. Cl.

| | |
|---|---|
| *G01C 21/34* | (2006.01) |
| *G06N 3/08* | (2006.01) |
| *G06N 3/04* | (2006.01) |
| *G06K 9/62* | (2006.01) |
| *G01C 21/20* | (2006.01) |
| *G06T 7/00* | (2017.01) |
| *G01S 19/13* | (2010.01) |
| *G06T 11/60* | (2006.01) |

(52) U.S. Cl.
CPC ......... *G01C 21/3415* (2013.01); *G01C 21/20* (2013.01); *G01C 21/3484* (2013.01); *G06K 9/6257* (2013.01); *G06N 3/04* (2013.01); *G06N 3/0454* (2013.01); *G06N 3/08* (2013.01); *G06T 7/0002* (2013.01); *G01S 19/13* (2013.01); *G06T 11/60* (2013.01); *G06T 2207/10032* (2013.01); *G06T 2207/20081* (2013.01); *G06T 2207/20084* (2013.01); *G06T 2207/30241* (2013.01)

(58) Field of Classification Search
CPC ............................ G01C 21/3415; G01C 21/20
See application file for complete search history.

(56) References Cited

U.S. PATENT DOCUMENTS

| | | | | |
|---|---|---|---|---|
| 5,214,757 | A * | 5/1993 | Mauney | G01C 21/32 340/990 |
| 9,123,152 | B1 * | 9/2015 | Chatham | G01C 21/34 |
| 9,886,805 | B1 * | 2/2018 | Bianchi, III | G07C 9/00896 |
| 2012/0027250 | A1 * | 2/2012 | Omer | G06K 9/68 382/103 |

(Continued)

*Primary Examiner* — Jess Whittington
(74) *Attorney, Agent, or Firm* — Schwegman Lundberg & Woessner, P.A.

(57) ABSTRACT

Systems and methods of identifying incorrect coordinate prediction using route information are disclosed herein. In some example embodiments, a computer system receives route information and geographic image data. The route information corresponds to a servicing of a request associated with a place and indicates a travelled route that has been traveled by a user in traveling from an origin location to the place, and the geographic image data represents a geographic area corresponding to the travelled route. The computer system determines that an initial geographic location stored in a database in association with the place is incorrect based on the route information and the geographic image data using a first deep learning model, and then performs a verification operation based on the determining that the stored initial geographic location of the place is incorrect.

19 Claims, 12 Drawing Sheets

(56) References Cited

U.S. PATENT DOCUMENTS

| | | | |
|---|---|---|---|
| 2013/0326407 A1* | 12/2013 | van Os | G06T 19/00 715/810 |
| 2014/0371951 A1* | 12/2014 | Michael | F02N 11/0807 701/2 |
| 2015/0262430 A1* | 9/2015 | Farrelly | G06Q 10/083 705/13 |
| 2015/0350840 A1* | 12/2015 | Pham | H04W 4/027 455/456.1 |
| 2016/0075272 A1* | 3/2016 | Cermak | B60Q 1/00 340/426.15 |
| 2016/0088425 A1* | 3/2016 | Goel | H04W 52/0235 455/41.1 |
| 2018/0293314 A1* | 10/2018 | Munley | G06Q 30/00 |
| 2018/0374032 A1* | 12/2018 | Pan | G01C 21/3461 |
| 2019/0063931 A1* | 2/2019 | Aoyama | H04W 4/40 |
| 2019/0204088 A1* | 7/2019 | Haque | G06N 3/0454 |
| 2019/0204110 A1* | 7/2019 | Dubielzyk | G01C 21/3697 |
| 2019/0293446 A1* | 9/2019 | Cho | G01C 21/3641 |
| 2020/0057921 A1* | 2/2020 | Navarrete Michelini | G06T 9/002 |

\* cited by examiner

IDENTIFYING INCORRECT COORDINATE PREDICTION USING ROUTE INFORMATION

TECHNICAL FIELD

Embodiments of the present disclosure relate generally to the technical field of geographic positioning for a networked computer system and, more particularly, but not by way of limitation, to systems and methods of identifying incorrect coordinate prediction using sensor data and satellite imagery.

BACKGROUND

A networked computer system can receive, from user devices, a request for a service. The request can include data related to a place that is to be involved in the providing of the service. For example, a user may submit a request, via the networked computer system, to be transported from a first place to a second place. The networked computer system may then transmit a geographical location of the first place and a geographical location of the second place to a device of a service provider for use in providing the service to the requester. However, although the request may include an identification of a place, the networked computer system may not have the corresponding geographical location of the place readily available. Additionally, current networked computer systems suffer from poor accuracy in predicting the actual geographical location of a place for which a user is requesting the service. For example, even though a request may include an address or a name of a place for which an address can be determined, the address of a place often does not accurately represent the precise location where the service should be provided.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
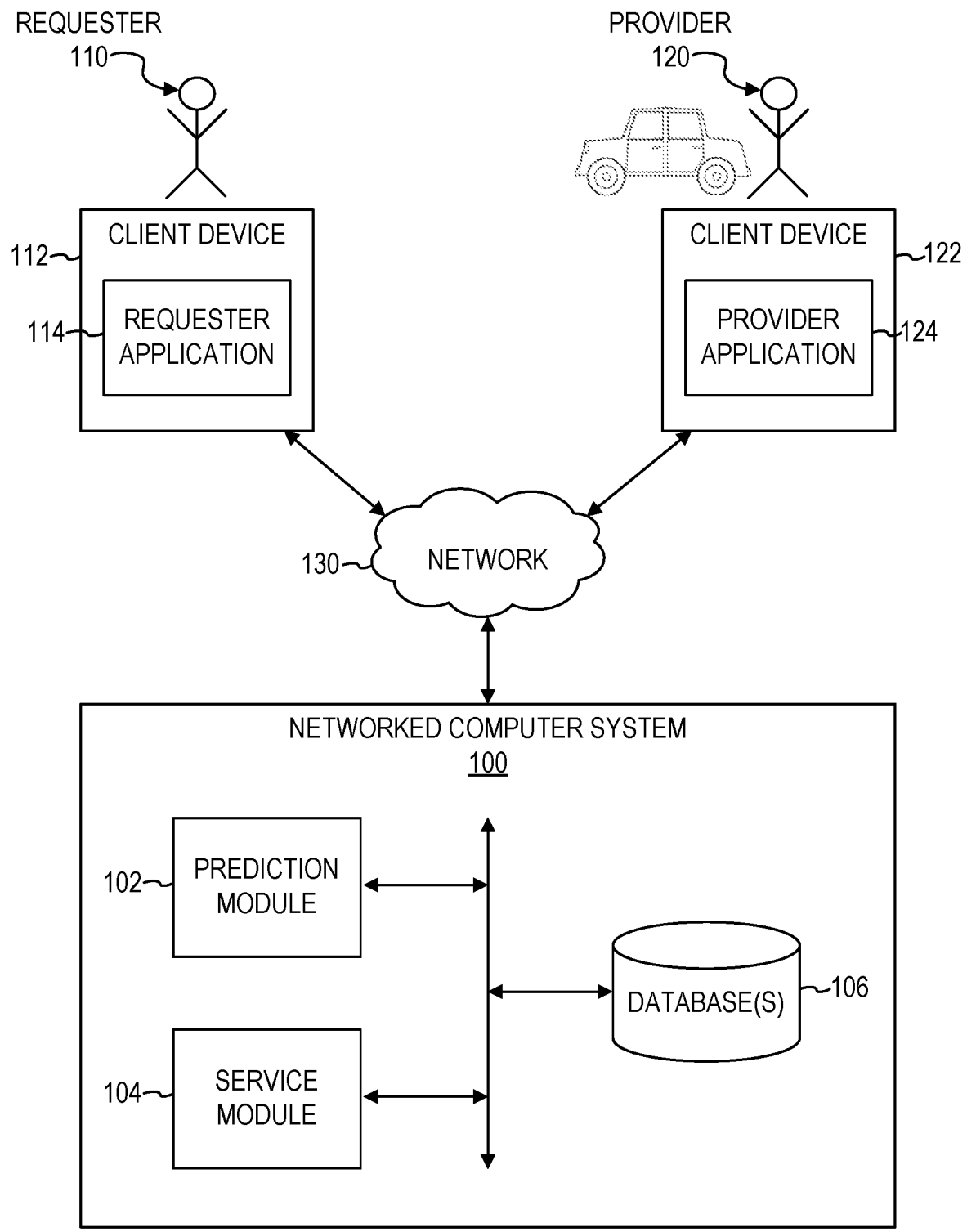
FIG. 1 is a block diagram of a system environment for a networked computer system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for improving the accuracy of computer-implemented coordinate prediction and geographic positioning. In some example embodiments, a technical solution involves training a deep learning model to determine that a geographic location stored in association with a place is incorrect based on route information indicating a travelled route to the place and geographic image data representing a geographic area corresponding to the travelled route, and then using the trained deep learning model to identify incorrect geographic locations for places based on route information and geographic image data. In some example embodiments, the identification of an incorrect geographic location for a place is used to trigger the performance of a verification operation for the geographic location for the place, such as by displaying a notification prompting correction of the geographic location for the place or by generating a new geographic location to be stored in association with the place, thereby improving the accuracy of coordinate prediction and geographic positioning operations of networked computer systems. Additionally, other technical effects will be apparent from this disclosure as well.

In some example embodiments, operations are performed by a computer system (or other machine) having a memory and at least one hardware processor, with the operations comprising: receiving route information and geographic image data, the route information corresponding to a servicing of a request associated with a place and indicating a travelled route that has been traveled by a user in traveling from an origin location to the place, and the geographic image data representing a geographic area corresponding to the travelled route; determining that an initial geographic location stored in a database in association with the place is incorrect based on the route information and the geographic image data using a first deep learning model; and performing a verification operation based on the determining that the stored initial geographic location of the place is incorrect.

In some example embodiments, the geographic image data comprises satellite image data. However, other types of geographic image data are also within the scope of the present disclosure.

In some example embodiments, the route information comprises a visual indication of the travelled route, and the receiving the route information and the geographic image data comprises receiving an image file comprising the visual indication of the travelled route superimposed onto the geographic image data. In some example embodiments, the indication of the travelled route comprises a single continuous line. In some example embodiments, the indication of the travelled route comprises a series of separate points.

In some example embodiments, the first deep learning model comprises a convolutional neural network. However, other types of deep learning models are also within the scope of the present disclosure.

In some example embodiments, the operations further comprise: receiving a plurality of training data, each one of the plurality of training data comprising training route information and training geographic image data for the training route information, the training route information corresponding to another servicing of another request associated with another place and indicating another travelled route that has been traveled by another user in traveling from another origin location to the other place, and the training geographic image data representing another geographic area corresponding to the other travelled route, a portion of the plurality of training data being identified as indicating that another initial geographic location stored in the database in association with the other place is incorrect, and a remaining portion of the plurality of training data being identified as indicating that another initial geographic location stored in the database in association with the other place is not incorrect; and training the first deep learning model using the plurality of training data.

In some example embodiments, the performing the verification operation comprises causing a notification to be displayed on a computing device, the notification indicating that the initial geographic location stored in association with the place in the database is incorrect.

In some example embodiments, the performing the verification operation comprises: generating a new geographic location for the place using corresponding service data for each one of a plurality of requests for a transportation service associated with the place, the transportation service comprising transportation of a requester of the request to or from the place, the corresponding service data indicating the new geographic location for the place; and storing, by the computer system, the new geographic location in a database in association with the place.

In some example embodiments, the performing the verification operation comprises causing a communication to be displayed in a computing device of the user, the communication prompting the user to confirm whether there was a problem in the servicing of the request associated with the place.

In some example embodiments, the operations further comprise: receiving the request associated with the place; generating a suggested route based on the request using a route-generating model; determining that there was a problem with the suggested route based on the route information and the geographic image data using a second deep learning model; and performing another verification operation based on the determining that there was a problem with the suggested route. In some example embodiments, the second deep learning model comprises a convolutional neural network. In some example embodiments, the performing the other verification operation comprises causing a notification to be displayed on a computing device, the notification indicating that there was a problem with the suggested route. In some example embodiments, the performing the other verification operation comprises modifying the route-generating model. In some example embodiments, the performing the other verification operation comprises causing a communication to be displayed in a computing device of the user, the communication prompting the user to confirm whether there was a problem in the servicing of the request associated with the place.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a block diagram of a system environment for a networked computer system 100, in accordance with some example embodiments. In some example embodiments, the networked computer system 100 coordinates the transportation of persons and/or goods/items for a service requester 110 (e.g., such as a rider) by a service provider 120 (e.g., a driver of a vehicle). The provider 120 uses a vehicle to provide the transportation to the requester 110.

In some example embodiments, the networked computer system 100 comprises any combination of one or more of a prediction module 102, a service module 104, and one or more databases 106. These modules and databases are not native components of a generic computer system, and provide structures and functions beyond generic functions of a computer system, as further described below.

In some example embodiments, the modules 102 and 104 and the database(s) 106 reside on a machine having a memory and at least one processor (not shown). In some example embodiments, the modules 102 and 104 and the database(s) 106 reside on the same machine, while in other example embodiments, one or more of the modules 102 and 104 and the database(s) 106 reside on separate remote machines that communicate with each other via a network (e.g., network 130). It is contemplated that other configurations are also within the scope of the present disclosure.

In some example embodiments, the requester 110 operates a client device 112 that executes a requester application 114 that communicates with the networked computer system 100. The requester 110 operates the requester application 114 to view information about the networked computer system 100, and to make a request for service from the networked computer system 100 for a delivery or transport service ("a trip") of the requester 110 (and, optionally, additional persons) and/or items, for example cargo needing transport. The requester application 114 determines a pick-up location within an origin location or enables the requester 110 to specify a pick-up location and/or a destination location associated with the trip. An origin location and/or a destination location may be a location inputted by the requester 110 or may correspond to the current location of the requester client device 112 as determined automatically by a location determination module (not shown) in the requester client device 112, e.g., a global positioning system (GPS) component, a wireless networking system, or a combination thereof. For purposes of simplicity, as described herein, an origin location can include a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends a pick-up location to the requester 110 based on historical trip data associated with the origin location.

According to examples herein, the requester client device 112 can transmit a set of data to the networked computer system 100 over a network 130 in response to requester input or operation of the requester application 114. Such data can be indicative of the requester's interest in potentially requesting service (e.g., before actually confirming or requesting the service). For example, the requester 110 may launch the requester application 114 and specify an origin location and/or a destination location to view information about the networked computer system 100 before making a decision on whether to request service. The requester 110 may want to view information about the average or estimated time of arrival for pick-up by the provider 120, the estimated time to the destination, the price, the available service types, etc. Depending on implementation, the data can include the origin and/or destination location information, requester information (e.g., identifier), application information (e.g., version number), device identifier or type, etc. According to some examples, each time the requester 110 modifies the origin and/or destination location, the requester application 114 can generate and transmit the data to the networked computer system 100.

The network 130 may be any network that enables communication between or among machines, databases, and devices (e.g., the networked computer system 100 and the client devices 112 and 122). Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Once the requester 110 confirms or orders a service via the requester application 114, the requester application 114 can generate data corresponding to a request for the service through the networked computer system 100 (e.g., also referred to herein as a "trip request"). Responsive to receiving a trip request, the networked computer system 100 determines the average estimated time of arrival (ETA) at the pick-up location of providers 120 whose current location is within a threshold distance of the pick-up location (e.g., providers 120 who are all within one mile of the pickup location). In some embodiments, responsive to determining that requester's ETA is within a threshold amount of time of the average ETA of nearby available providers 120, the networked computer system 100 uses information from the trip request to match the requester 110 with an available provider 120. Depending on implementation, the trip request can include requester or device information (e.g., a requester identifier, a device identifier), a service type (e.g., vehicle type) and/or selected service option (such as described herein), an origin location, a destination location, a payment profile identifier, a desired departure time, and/or other data. The networked computer system 100 selects a provider 120 from a set of providers, such as based on the provider's current location and status (e.g., offline, online, available, etc.) and/or information from the trip request (e.g., service type, origin location, and/or destination location), to provide the service for the requester and transport the requester 110 from the origin location to the destination location. Responsive to selecting an available provider 120, the networked computer system 100 sends an invitation message to the provider client device 122 inviting the provider 120 to fulfill the trip request.

In one example embodiment, the networked computer system 100 periodically determines the requester's ETA at the pick-up location based on the topological and geospatial location of the requester client device 112. In some example embodiments, the networked computer system 100 selects the provider 120 based on a comparison of the requester's ETA and the provider's ETA at the pick-up location. For example, if the networked computer system 100 determines that the requester 110 is about three minutes away from the pick-up location, the networked computer system 100 might select a provider 120 who is also about three minutes away even if other providers 120 have a shorter ETA.

If, after matching the requester 110 with an available provider 120, the networked computer system 100 determines that the requester's ETA and the provider's ETA at the pick-up location vary by over a threshold amount of time, the networked computer system 100 can reassign the trip to another available provider 120.

The provider 120 operates a client device 122 executing a provider application 124 that communicates with the networked computer system 100 to provide information indicating whether the provider 120 is available or unavailable to provide transportation services to requesters 110. The provider application 124 can also present information about the networked computer system 100 to the provider 120, such as invitations to provide service, navigation instructions, map data, etc. In one example embodiment, the provider application 124 enables the provider 120 to provide information regarding availability of the provider 120 by logging into the networked computer system 100 and activating a setting indicating that they are currently available to provide service. The provider application 124 also provides the current location of the provider 120 or the provider client device 122 to the networked computer system 100. Depending on implementation, the current location may be a location inputted by the provider 120 or may correspond to the current location of the provider client device 122 as determined automatically by a location determination module (not shown) in the provider client device 122, e.g., a GPS component, a wireless networking system, or a combination thereof. The provider application 124 further allows a provider 120 to receive, from the networked computer system 100, an invitation message to provide a service for a requesting requester 110, and if the provider 120 accepts via input, the provider application 124 can transmit an acceptance message to the networked computer system 100. The networked computer system 100 can subsequently provide information about the provider 120 to the requester application 114. In another example embodiment, the provider application 124 can enable the provider 120 to view a list of current trip requests and to select a particular trip request to fulfill. The provider application 124 can also receive routing information from the networked computer system 100.

In some example embodiments, the requester client device 112 and provider client device 122 are portable or mobile electronic devices such as smartphones, tablet devices, wearable computing devices (e.g., smartwatches) or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDP A, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, can present information received from the networked computer system 100 on a requester interface, such as a map of the geographic region, and the current location of the requester client device 112 or the provider client device 122. The applications 114 and 124 running on the requester client device 112 and the provider client device 122 can determine the current location of the respective device and provide the current location to the networked computer system 100.

The networked computer system 100 is configured to provide a communicative interface between the requester application 114, the provider application 124, and the various modules and databases in the networked computer system 100. The networked computer system 100 is configured to receive provider availability status information and current location information from the provider application 124 and update the database(s) 106 with the availability status. The networked computer system 100 is also configured to receive trip requests from the requester application 114 and creates corresponding trip records in the database(s) 106. According to an example embodiment, a trip record corresponding to a trip request can include or be associated with a trip ID, a requester ID, an origin location, a destination location, a service type, pricing information, and/or a status indicating that the corresponding trip request has not been processed. According to one example embodiment, when a provider 120 accepts the invitation message to service the trip request for the requester 110, the trip record can be updated with the provider's information as well as the provider's location and the time when the trip request was accepted. Similarly, location and time information about the service as well as the cost for the service can be associated with the trip record.

In one example embodiment, during the trip, the networked computer system 100 receives information (e.g., periodically) from the provider application 124 indicating the location of the provider's vehicle and/or telematics information (e.g., indications of current speed, acceleration/deceleration, events, stops, and so forth). The networked computer system 100 stores the information in the database(s) 106 and can associate the information with the trip record. In some example embodiments, the networked computer system 100 periodically calculates the provider's ETA at the pick-up location and provides the provider's ETA to the requester application 114.

The networked computer system 100 determines the geospatial and topological location of the requester client device 112 in response to the requester 110 making a trip request through the requester application 114. In one example embodiment, the requester application 114 periodically transmits geospatial location information of the requester client device 112 to the networked computer system 100. The geospatial location information can correspond to a current location data point of the requester client device 112 at an instance in time. Such a location data point can be generated by a location determination module (not shown) in the requester client device 112, e.g., a GPS component, a wireless networking system, or a combination thereof.

In some example embodiments, the requester application 114 and the provider application 124 are configured to display map data indicating a specific geographical location of a place, as well as navigation instructions for the requester 110 using the requester application 114 on how to navigate (e.g., walk) to the specific geographical location of the place and navigation instructions for the provider 120 using the provider application 124 on how to navigate (e.g., drive) to the specific geographical location of the place. For example, the provider application 124 may display, on the client device 122 of the provider 120, a map that includes a graphic element that corresponds to the current location of the provider 120 or the client device 122 of the provider 120 and a graphic element that corresponds to the specific geographical location of a place associated with a service request, such as a place to pick up or drop off a requester 110 associated with the service request, as well as a route from the current location of the provider 120 or the client device 122 of the provider 120 to the specific geographical location of the place associated with the service request. Similarly, the requester application 114 may display, on the client device 112 of the requester 110, a map that includes a graphic element that corresponds to the current location of the requester 110 or the client device 112 of the requester 110 and a graphic element that corresponds to the specific geographical location of the place associated with the service request, as well as a route from the current location of the requester 110 or the client device 112 of the requester 110 to the specific geographical location of the place associated with the service request.

The map data and the navigation instructions are generated based on the specific geographical location of the place associated with the service request. In some example embodiments, the corresponding map data and navigation instructions are generated by the requester application 114 and the provider application 124 using the geographical location of the place, which is received by the requester application 114 and the provider application 124 from the networked computer system 100. For example, the networked computer system 100 may store the geographical location of the place in association with an identifier of the place (e.g., a name of the place, an address of the place) in the database(s) 106, and then transmit the geographical location of the place to the requester application 114 and the provider application 124 for use in generating the corresponding map data and navigation instructions that are to be generated and displayed by the requester application 114 and the provider application 124. In other example embodiments, the corresponding map data and navigation instructions are generated by the networked computer system 100 using the geographical location of the place stored in the database(s) 106 of the networked computer system 100 in association with an identifier of the place (e.g., a name of the place, an address of the place), and then transmitted to the requester application 114 and the provider application 124 for display on client device 112 of the requester 110 and the client device 122 of the provider 120.

In some example embodiments, the geographical location of a place comprises a geocode. A geocode comprises a spatial representation in numerical coordinates, such as latitude and longitude, of a physical location (e.g., a physical address). Other types of representations of a physical location may additionally or alternatively be used as the geographical location in providing the features disclosed herein.

Figure 2:
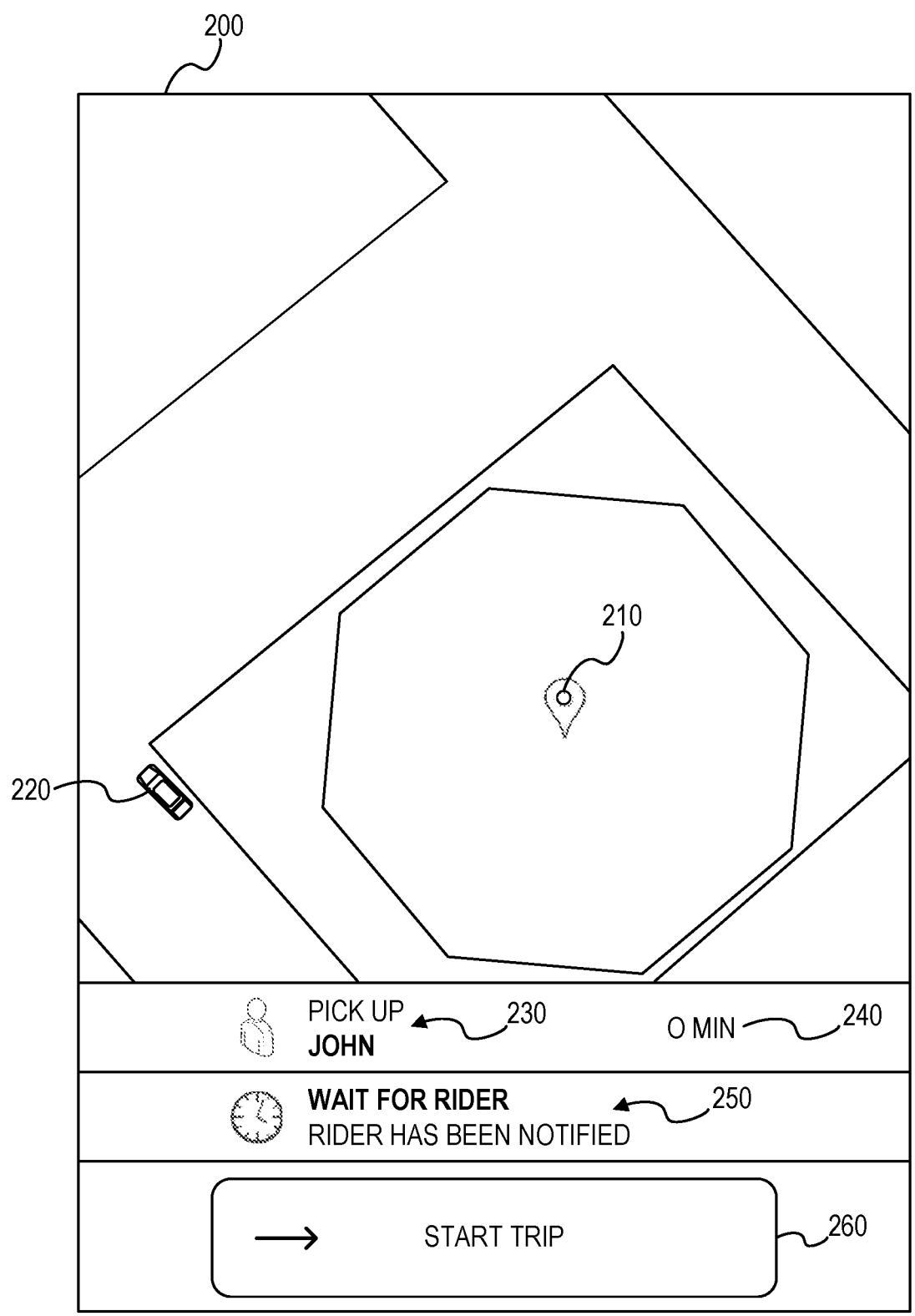
FIG. 2 illustrates a graphical user interface (GUI) in which a provider of a service may signal that the provider has started transporting a requester, in accordance with some example embodiments.

FIG. 2 illustrates a graphical user interface (GUI) 200 in which a provider 120 of a transportation service may signal that the provider 120 has started transporting a requester, in accordance with some example embodiments.

The GUI 200 may be generated by the provider application 124 and display an indication 210 of the geographical location of the place and an indication 220 of the geographical location of the provider 120 or the client device 122 of the provider 120. The GUI 200 may also display supplemental information, such as an identification 230 of a requester 110 to be picked up by the provider 120, an indication 240 of the amount of time until the provider 120 of the client device 122 of the provider 120 arrives at the pick-up location, and an indication 250 that the requester 110 has been notified that the provider 120 has arrived at the pick-up location. In some example embodiments, the GUI 200 comprises a selectable user interface element 260 (e.g., a button configured to be swiped or tapped by the provider 120) configured to, in response to its selection by the provider 120, trigger the transmission of a signal to the networked computer system 100 indicating that the provider 120 is starting or has started the transporting of the requester 110 in servicing the request. The networked computer system 100 may use the signal to store the geographical location of the provider 120 (e.g., the GPS coordinates of the client device 122 of the provider 120) as an origin or starting location for travelling to a destination location for the transportation service. The networked computer system 100 may alternatively use the signal to trigger a determination of the geographical location of the client device 112 of the requester 110, using the determined geographical location as the origin or starting location for travelling to a destination location for the transportation service. The networked computer system 100 may track the path of the client device 122 of the provider 120 or the client device 112 of the requester 110 from the origin or starting location to a destination location corresponding to a place, such as by obtaining a series of GPS coordinates of the client device 122 or 112 from the origin location to the destination location.

Figure 3:
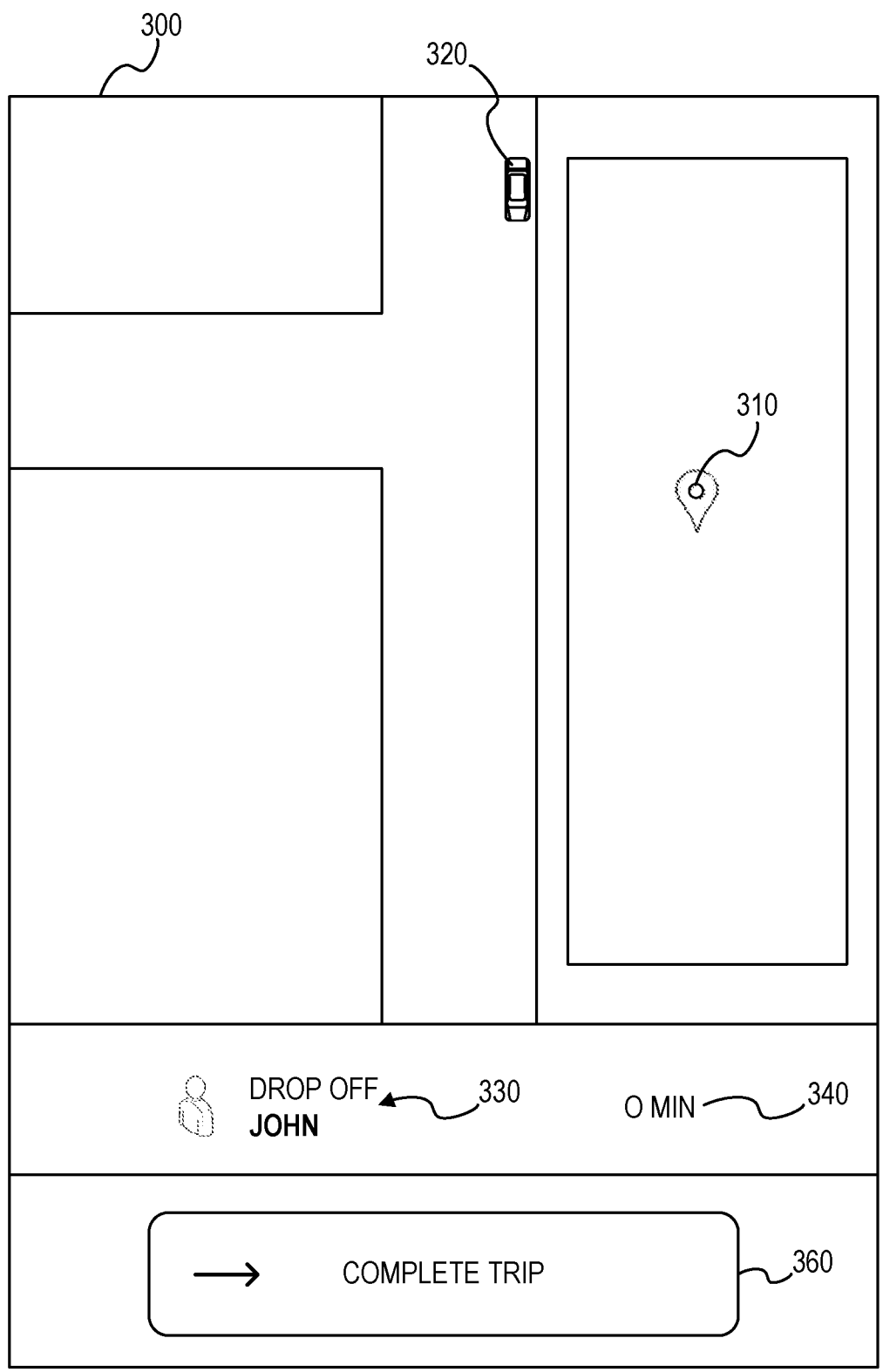
FIG. 3 illustrates a GUI in which the provider of the service may signal that the provider has completed transporting the requester, in accordance with some example embodiments.

FIG. 3 illustrates a GUI 300 in which the provider 120 of the transportation service may signal that the provider 120 has completed transporting the requester 110, in accordance with some example embodiments. The GUI 300 may be generated by the provider application 124 and display an indication 310 of the geographical location of the place and an indication 320 of the geographical location of the provider 120 or the client device 122 of the provider 120. The GUI 300 may also display supplemental information, such as an identification 330 of a requester 110 to be dropped off by the provider 120 and an indication 340 of the amount of time until the provider 120 of the client device 122 of the provider 120 arrives at the drop-off location. In some example embodiments, the GUI 300 comprises a selectable user interface element 360 (e.g., a button configured to be swiped or tapped by the provider 120) configured to, in response to its selection by the provider 120, trigger the transmission of a signal to the networked computer system 100 indicating that the provider 120 is completing or has completed the transporting of the requester 110 in servicing the request. The networked computer system 100 may use the signal to store the geographical location of the provider 120 (e.g., the GPS coordinates of the client device 122 of the provider 120) as a destination location for the place indicated as the drop-off location in the request submitted by the requester 110, and thereby identify the geographical location as the end of the route from the origin location to the place for that particular servicing of the request.

In some example embodiments, the service module 104 stores an indication of the route travelled by the client device 112 or the client device 122 from the origin location to the destination. The indication of the route may comprise a series of geographical locations (e.g., geocodes) that together form the travelled route or may comprise a visual indication of the route, such as a continuous or segmented line forming the travelled route superimposed over a visual representation of the geographical area covering the travelled route (e.g., geographic image data representing the geographical area). In some example embodiments, for each request for service associated with a place, an indication of the corresponding travelled route of the request is stored in the database(s) 106 in association with the place associated with the request.

In some example embodiments, the prediction module 102 is configured to train a deep learning model to determine that a geographic location stored in association with a place is incorrect based on route information indicating a travelled route to the place and geographic image data that visually represents a geographic area corresponding to the travelled route, and then use the trained deep learning model to identify incorrect geographic locations for places based on route information and geographic image data. Certain characteristics of a travelled route to a place indicate that the stored geographic location for the place is incorrect, while other characteristics of a travelled route to a place indicate that the stored geographic location for the place is correct. For example, a travelled route that is circuitous, involves back-tracking, or is otherwise inefficient may indicate that the stored geographic location used for that travelled route is incorrect, while a travelled route that is more direct or otherwise efficient may indicate that the stored geographic location used for that travelled route is correct.

In some example embodiments, the prediction module 102 receives a plurality of training data. Each one of the plurality of training data comprises training route information, as well as training geographic image data for the training route information. Each training route information corresponds to a servicing of a request associated with a place and indicates a travelled route that has been traveled by a user in traveling from an origin location to the place. The training geographic image data for the training route information represents a geographic area corresponding to the travelled route. A portion of the plurality of training data is labeled, or otherwise identified, as indicating that the initial geographic location stored in the database in association with the place corresponding to that portion of the plurality of training data is incorrect, and a remaining portion of the plurality of training data is labeled, or otherwise identified, as indicating that the initial geographic location stored in the database in association with the place corresponding to that remaining portion of the plurality of training data is not incorrect (e.g., is correct). The prediction module 102 trains a deep learning model, using the plurality of training data, to identify when an incorrect geographic location is used for a place based on route information and geographic image data associated with the place. In some example embodiments, the deep learning model comprises a convolutional neural network. However, other types of deep learning models may also be used.

In some example embodiments, the predication module 102 retrieves the training data from the database(s) 106. For example, the prediction module 102 may access the indications of travelled routes that are stored as records in the database(s) 106 in association with one or more places. In some example embodiments, once the deep learning model is trained using the plurality of training data, the prediction module 102 is used to determine whether or not a geographic location stored in association with a place is incorrect. The prediction module 102 receives route information and geographic image data associated with a place for which the stored geographical location is to be evaluated for correctness. The route information corresponds to a servicing of a request associated with the place and indicates a travelled route that has been traveled by a user in traveling from an origin location to the place. The geographic image data represents a geographic area corresponding to the travelled route.

Figure 4:
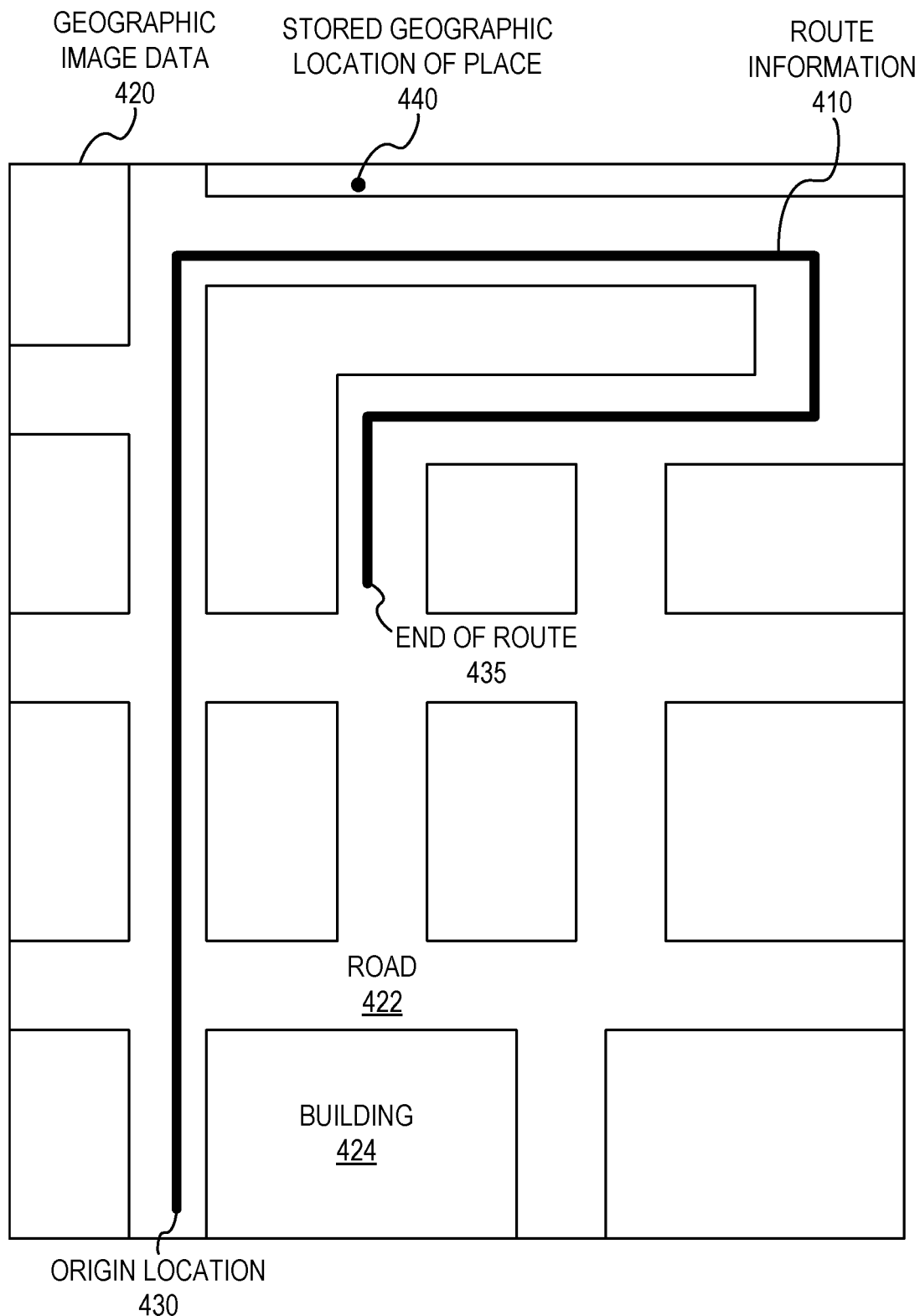
FIG. 4 illustrates route information for a route to a place having an incorrect geographic location superimposed onto geographic image data, in accordance with some example embodiments.

FIG. 4 illustrates route information 410 for a route to a place having an incorrect geographic location 440 superimposed onto geographic image data 420, in accordance with some example embodiments. The geographic image data 420 comprises image data that visually represents a geographic area corresponding to the travelled route. In some example embodiments, the geographic image data 420 comprises satellite image data, which may include roads 422 and buildings 424, as well as other aspects and features of a geographic area that may be involved in navigation. The satellite image data comprises one or more images of the Earth that are collected by imaging satellites, such as those satellites operated by governments or businesses. In some example embodiments, each image of the satellite image data is focused on a particular section of the Earth. For example, the image of the satellite image data may be limited to a 100-meter by 100-meter section of the Earth. The satellite image data may comprise multiple images of different sections of the Earth corresponding to the place with which the satellite image data is associated, such as a plurality of different 100-meter by 100-meter sections encompassing the travelled route indicated by the route information 410. Other types of geographic image data 420 are also within the scope of the present disclosure.

The route information 410 comprises a visual indication of the travelled route from an origin location 430 (e.g., the starting location of a trip) to an end of the route 435 (e.g., the destination location of the trip). In some example embodiments, the visual indication of the travelled route comprises a single continuous line, as shown by the route information 410 in FIG. 4. However, the visual indication of the travelled route may comprise other forms as well. For example, in FIG. 5, the visual indication of the travelled route comprises a series of separate points.

Figure 5:
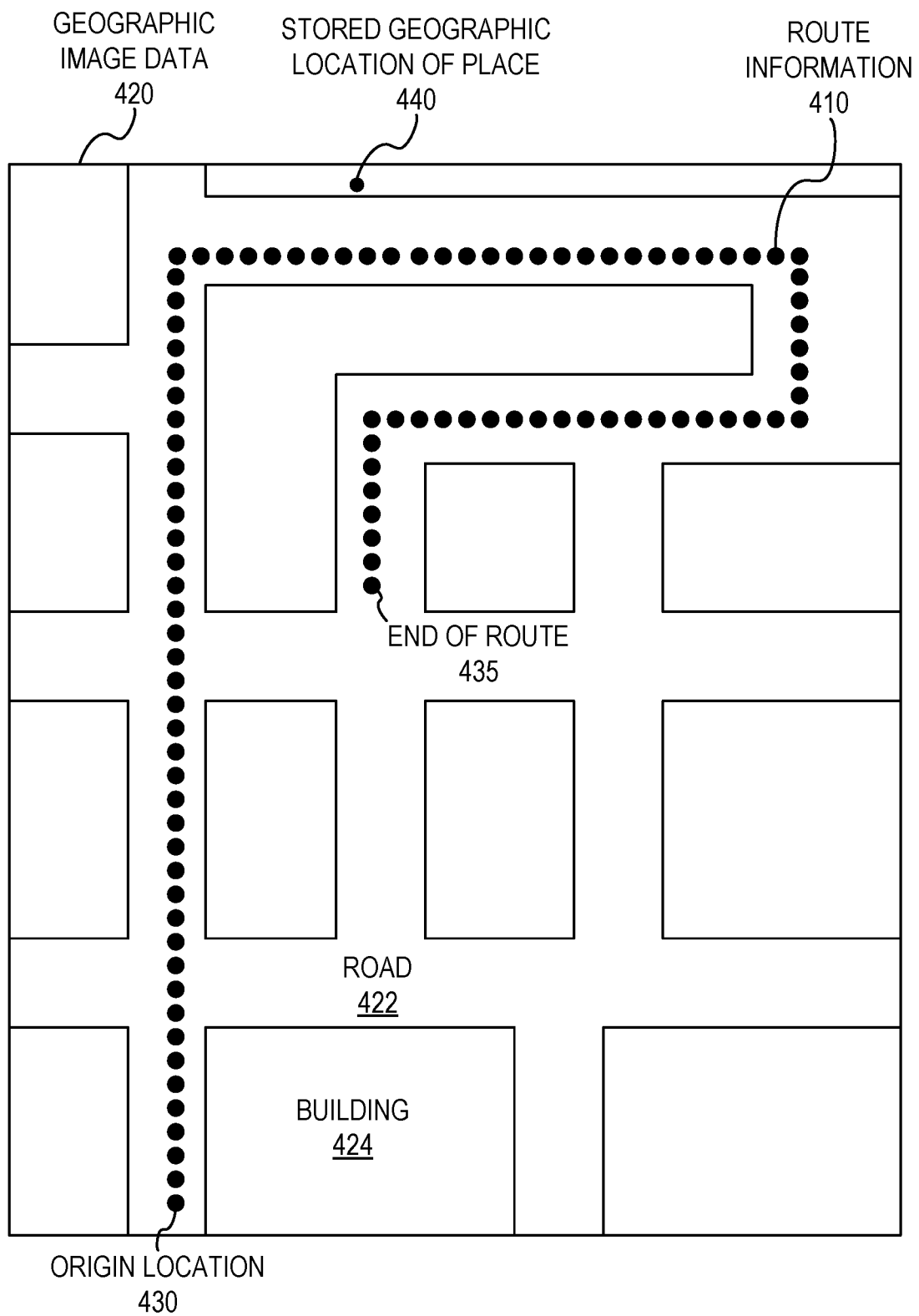
FIG. 5 illustrates route information for a route to a place having an incorrect geographic location superimposed onto geographic image data, in accordance with some example embodiments.
Figure 6:
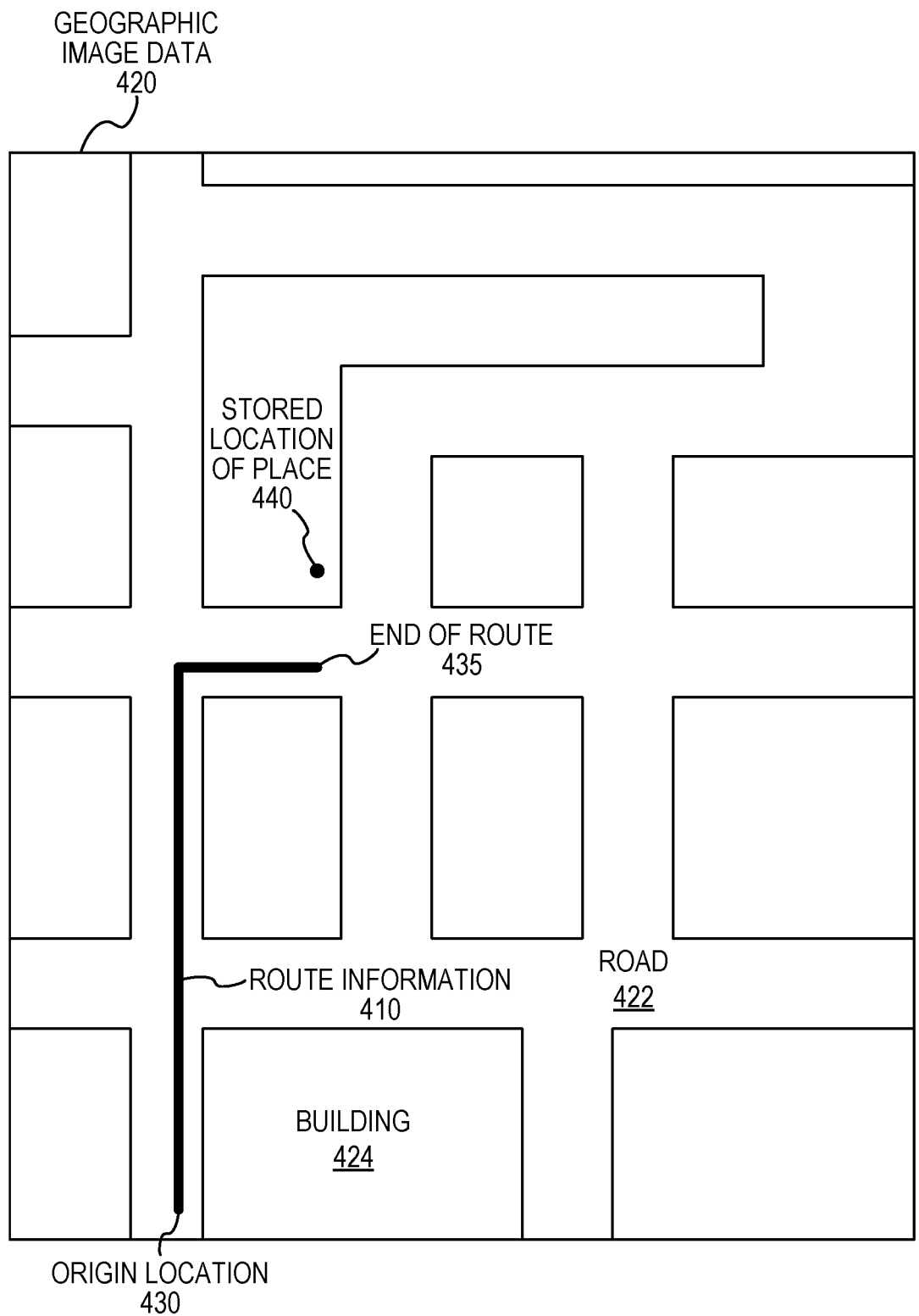
FIG. 6 illustrates route information for a route to a place having a correct geographic location superimposed onto geographic image data, in accordance with some example embodiments.

In some example embodiments, the route information 410 and the geographic image data 420 are combined into a single image file in which the route information 410 is superimposed onto the geographic image data 420, such as shown in FIGS. 4-6, and the route information 410 and the geographic image data 420 are received by the prediction module 102 for processing as the single image file. However, the route information 410 and the geographic image data 420 may alternatively be received by the prediction module 102 as separate files.

The prediction module 102 is configured to determine that an initial geographic location stored in a database in association with the place is incorrect based on the route information 410 and the geographic image data 420 using the trained deep learning model. In the examples shown in FIGS. 4 and 5, the route information 410 and geographic image data 420 indicate that the stored geographic location of the place 440 is incorrect, since the route information 410 indicates that the travelled route included a circuitous and indirect path that passed by the stored geographic location of the place 440, leading to the end of the route 435 on a different street from the stored geographic location of the place 440. Therefore, the trained deep learning model may determine that the stored geographic location of the place 440 is incorrect based on the route information 410 and the geographic image data 420 of FIGS. 4 and 5.

In the example shown in FIG. 6, the route information 410 and geographic image data 420 indicate that the stored geographic location of the place 440 is not incorrect, since the route information 410 indicates that the travelled route included a direct path, with the end of the route 435 located proximate to the stored geographic location of the place 440. Therefore, in this example, the trained deep learning model may determine that the stored geographic location of the place 440 is not incorrect based on the route information 410 and the geographic image data 420 of FIG. 6.

In some example embodiments, the prediction module 102 is configured to determine whether or not an initial geographic location stored in a database in association with a place is incorrect based on the route information 410, without the geographic image data 420, using the trained deep learning model, and the deep learning model is trained as previously discussed, but without the training geographic image data. In some cases, the use of the route information 410 without the accompanying geographic image data 420 may be enough to accurately determine whether or not the initial geographic location of the place is incorrect. However, the absence of the geographic image data 420 in this analysis causes a technical problem in that it is more susceptible to inaccurate determinations. The geographic image data 420 provides additional detail and context of the travelled route represented by the route information 410, thereby enabling the deep learning model to use granular detail of the travelled route to provide a more accurate determination, resulting in the networked computer system 100 functioning more accurately and effectively.

In some example embodiments, the prediction module 102 is configured to aggregate different route information 410 and geographic image data 420 from different requests for the same place, make determinations for each request (e.g., based on the route information 410 and the geographic image data 420 of the request), and determine whether the stored geographic location for the place is incorrect based on the determinations using a criteria. For example, the prediction module 102 may be configured to determine that the stored geographic location for the place is incorrect based on a threshold number of determinations of incorrect geographic location being made for the aggregated data of the requests for the place (e.g., at least twenty trip requests having corresponding route information 410 and geographic image data 420 indicating that the stored geographic location of the place is incorrect). In another example, the prediction module 102 may be configured to determine that the stored geographic location for the place is incorrect based on a threshold percentage or portion of determinations of incorrect geographic location being made for the aggregated data of the requests for the place (e.g., at least 50% of the trip requests having corresponding route information 410 and geographic image data 420 indicating that the stored geographic location of the place is incorrect). Other criteria are also within the scope of the present disclosure.

In some example embodiments, the prediction module 102 is configured to perform a verification operation based on the determination that the stored initial geographic location of the place is incorrect. The verification operation comprises any operation configured to enable a user of the networked computer system 100, an administrator of the networked computer system 100, or the networked computer system 100 itself to verify that the stored initial geographic location of the place is incorrect or to perform a remedial action to remedy the fact that the stored initial geographic location of the place is incorrect.

Figure 7:
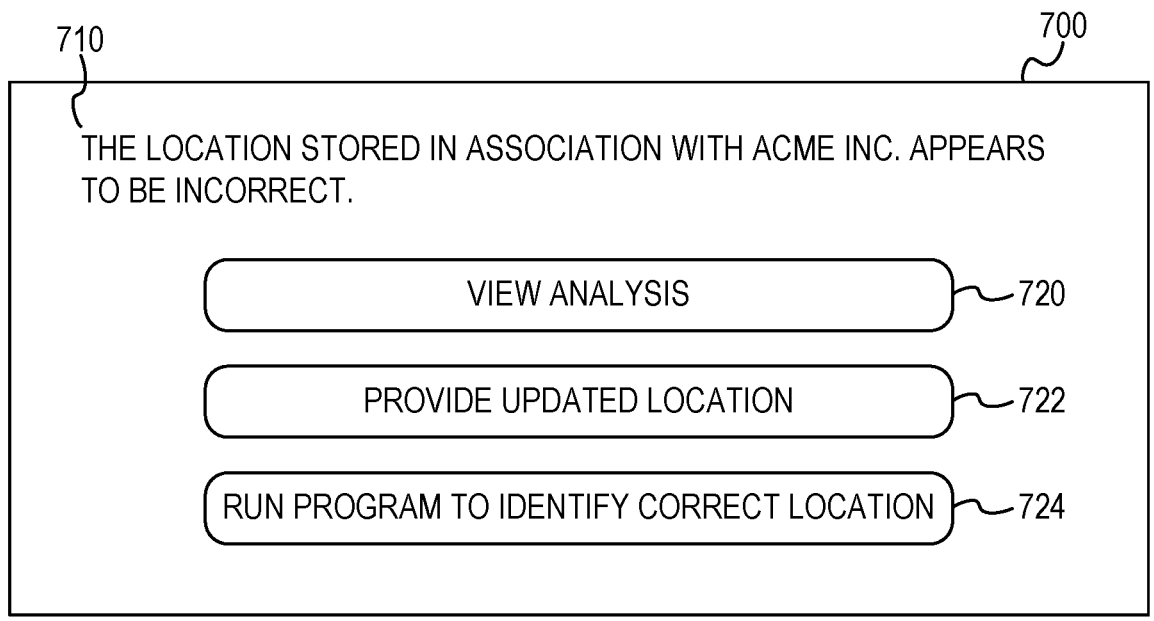
FIG. 7 illustrates a GUI displaying a notification indicating that an initial geographic location stored in association with a place in a database is incorrect, in accordance with some example embodiments.

In some example embodiments, the verification operation comprises causing a notification to be displayed on a computing device. The notification indicates that the initial geographic location stored in association with the place in the database is incorrect. FIG. 7 illustrates a GUI 700 displaying a notification 710 indicating that an initial geographic location stored in association with a place (e.g., "ACME INC." in FIG. 7) in a database is incorrect, in accordance with some example embodiments. In some example embodiments, in addition to the notification 710, the GUI 700 also displays one or more selectable user interface elements, such as selectable user interface elements 720, 722, and 724, configured to trigger an action by the networked computer system 100. The selectable user interface element 720 is configured to display an analysis of how the stored geographic location of the place was determined to be incorrect (e.g., by displaying the route information 410 and geographic image data 420 of one or more requests for the place) in response to, or otherwise based on, its selection. The selectable user interface element 722 is configured to, in response to, or otherwise based on, its selection, display a specialized user interface configured to receive input identifying an updated geographic location to be stored in association with the place. The selectable user interface element 724 is configured to, in response to, or otherwise based on, its selection, trigger the running of a program configured to identify the correct geographic location of the place for storing in association with the place. Other types of selectable user interface elements are also within the scope of the present disclosure.

In some example embodiments, the verification operation comprises generating a new geographic location for the place using corresponding service data for each one of a plurality of requests for a transportation service associated with the place, and then storing the new geographic location in the database(s) 106 in association with the place. The transportation service comprises transportation of a requester 110 of the request to or from the place, as previously discussed above, and the corresponding service data indicates the new geographic location for the place. For example, the verification operation may be configured to determine the new geographic location for the place based on an analysis of pick-up data indicating a pick-up location where the transportation of the requester 110 began and/or drop-off data indicating a drop-off location where the transportation of the requester 110 ended. Other ways of generating the new geographic location for the place are also within the scope of the present disclosure.

Figure 8:
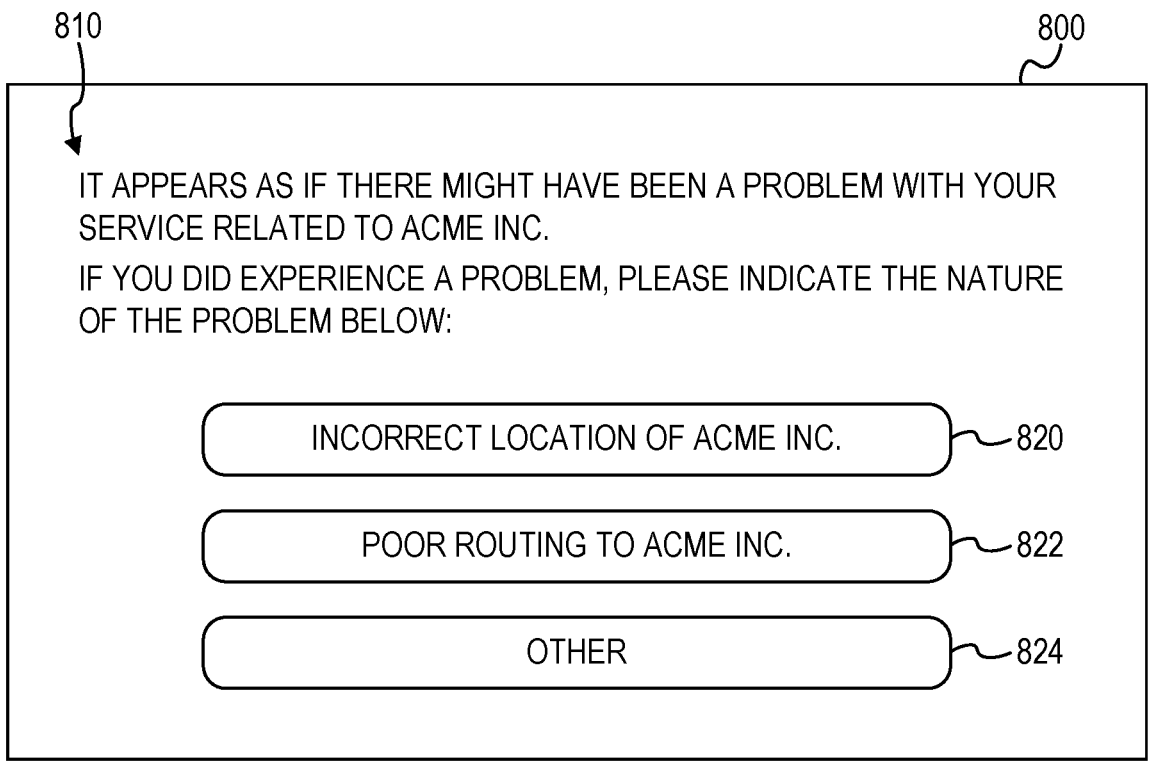
FIG. 8 illustrates a GUI displaying a communication prompting a user to confirm whether there was a problem in a servicing of a request associated with a place, in accordance with some example embodiments.

In some example embodiments, the verification operation comprises causing a communication to be displayed in a computing device of the user. The communication comprises a prompting of the user to confirm whether there was a problem in the servicing of the request associated with the place. FIG. 8 illustrates a GUI 800 displaying a communication 810 prompting a user to confirm whether there was a problem in a servicing of a request associated with a place, in accordance with some example embodiments. In some example embodiments, in addition to the communication 810, the GUI 800 also displays one or more selectable user interface elements, such as selectable user interface elements 820, 822, and 824, configured to enable the user to provide input indicating the nature of the problem in the servicing of the request associated with the place. The selectable user interface element 820 is configured to indicate that an incorrect geographic location was used in the servicing of the request associated with the place in response to, or otherwise based on, its selection. The selectable user interface element 822 is configured to indicate that an incorrect or otherwise poor route was used in the servicing of the request associated with the place in response to, or otherwise based on, its selection. The selectable user interface element 824 is configured to enable the user to provide an indication of some other type of problem (e.g., opening a text field in which the user can enter and submit text to explain the problem), in response to, or otherwise based on, its selection. Other types of selectable user interface elements are also within the scope of the present disclosure.

In some example embodiments, the prediction module 102 is configured to train another deep learning model to determine that there was a problem with a suggested route based on the route information 410 and the geographic image data 420, and then use the other trained deep learning model to determine that there was a problem with a suggested route based on the route information 410 and the geographic image data 420. The other deep learning model may comprise a convolutional neural network. However, other types of deep learning models are also within the scope of the present disclosure.

In some example embodiments, the service module 104 is configured to receive a request associated with the place, such as a request for transportation service or navigation instructions from a starting geographic location to a destination geographic location, and to generate a suggested route based on the request using a route-generating model. In some example embodiments, the prediction module 102 is configured to determine that there was a problem with the suggested route based on the route information 410 and the geographic image data 420 using the other deep learning model, and to perform another verification operation based on the determination that there was a problem with the suggested route.

In some example embodiments, the other verification operation comprises causing a notification to be displayed on a computing device, and the notification indicates that there was a problem with the suggested route, similar to the notification 710 in FIG. 7. In some example embodiments, the other verification operation comprises modifying the route-generating model based on the route information 410 and the geographic image data 420 using a machine learning algorithm. In some example embodiments, the other verification operation comprises causing a communication to be displayed in a computing device of the user, and the communication comprises a prompting of the user to confirm whether there was a problem in the servicing of the request associated with the place, similar to the communication 810 in FIG. 8. Other types of verification operations are also within the scope of the present disclosure.

Figure 9:
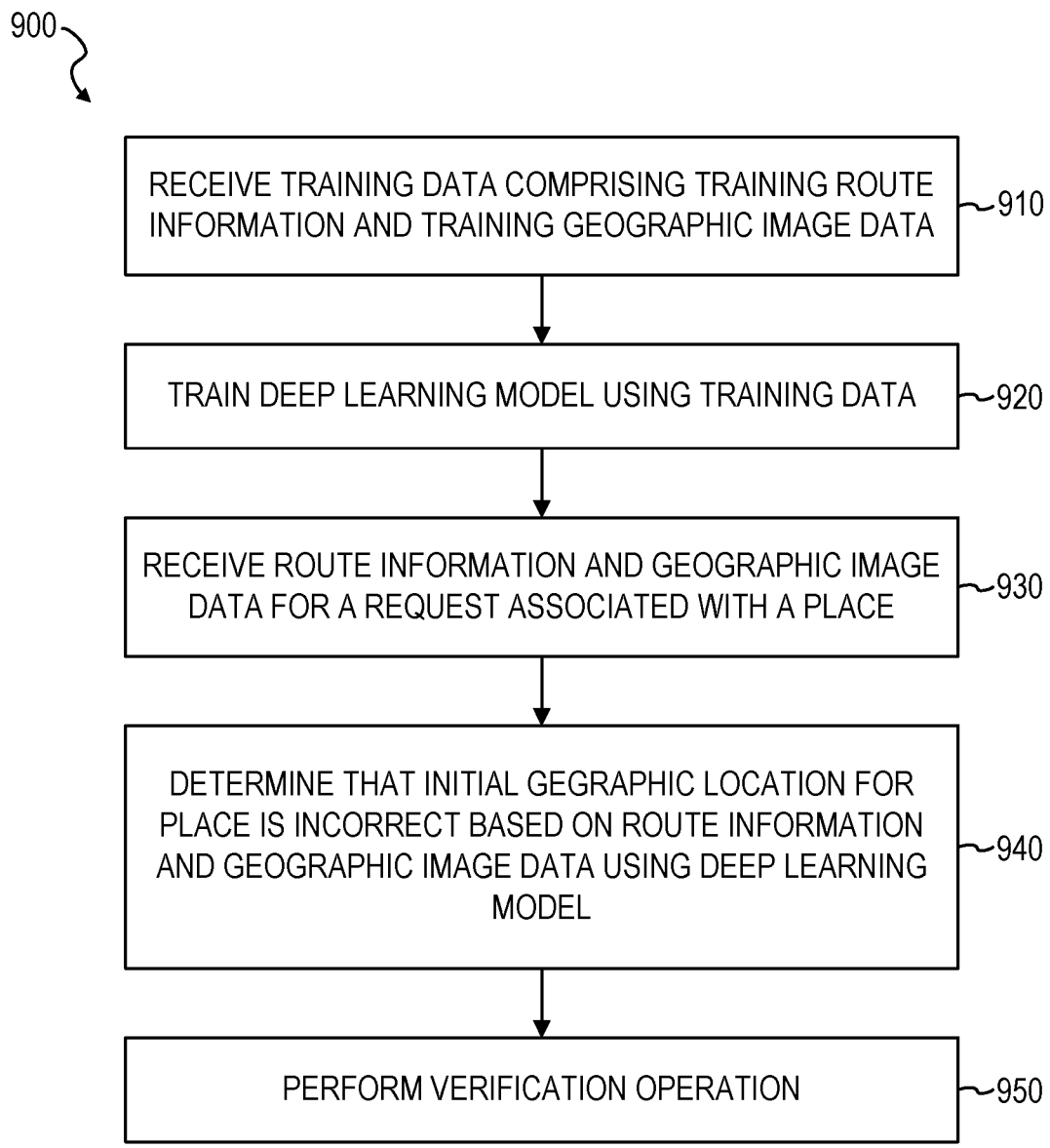
FIG. 9 is a flowchart illustrating a method of identifying incorrect coordinate prediction for a place using sensor data and satellite imagery, in accordance with some example embodiments.

FIG. 9 is a flowchart illustrating a method 900 of identifying incorrect coordinate prediction for a place using sensor data and satellite imagery, in accordance with some example embodiments. The method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the networked computer system 100 of FIG. 1, or any combination of one or more of its components or modules (e.g., prediction module 102, service module 104), as described above.

At operation 910, the prediction module 102 receives a plurality of training data, with each one of the plurality of training data comprising training route information and training geographic image data for the training route information. Each training route information corresponds to a servicing of a request associated with a place and indicates a travelled route that has been traveled by a user in traveling from an origin location to the place. Each training geographic image data represents a geographic area corresponding to the travelled route. A portion of the plurality of training data is labeled, or otherwise identified, as indicating that an initial geographic location stored in a database in association with the place is incorrect, and a remaining portion of the plurality of training data is labeled, or otherwise identified, as indicating that the initial geographic location stored in the database in association with the place is not incorrect.

At operation 920, the prediction module 102 trains a first deep learning model using the plurality of training data. In some example embodiments, the first deep learning model comprises a convolutional neural network. However, other types of deep learning models are also within the scope of the present disclosure.

At operation 930, the prediction module 102 receives route information and geographic image data. The route information corresponds to a servicing of a request associated with a place and indicates a travelled route that has been traveled by a user in traveling from an origin location to the place, and the geographic image data represents a geographic area corresponding to the travelled route. In some example embodiments, the geographic image data comprises satellite image data. However, other types of geographic image data are also within the scope of the present disclosure. In some example embodiments, the route information comprises a visual indication of the travelled route, and the receiving the route information and the geographic image data comprises receiving an image file comprising the visual indication of the travelled route superimposed onto the geographic image data. In some example embodiments, the indication of the travelled route comprises a single continuous line. In some example embodiments, the indication of the travelled route comprises a series of separate points.

At operation 940, the prediction module 102 determines that an initial geographic location stored in a database in association with the place is incorrect based on the route information and the geographic image data using the first deep learning model.

At operation 950, the prediction module 102 performs a verification operation based on the determination at operation 940 that the stored initial geographic location of the place is incorrect. In some example embodiments, the verification operation comprises causing a notification to be displayed on a computing device, with the notification indicating that the initial geographic location stored in association with the place in the database is incorrect. In some example embodiments, the verification operation comprises generating a new geographic location for the place using corresponding service data for each one of a plurality of requests for a transportation service associated with the place, and storing the new geographic location in a database in association with the place, with the transportation service comprising transportation of a requester of the request to or from the place, and the corresponding service data indicating the new geographic location for the place. In some example embodiments, the verification operation comprises causing a communication to be displayed in a computing device of the user, with the communication prompting the user to confirm whether there was a problem in the servicing of the request associated with the place.

It is contemplated that any of the other features described within the present disclosure can be incorporated into the method 900.

Figure 10:
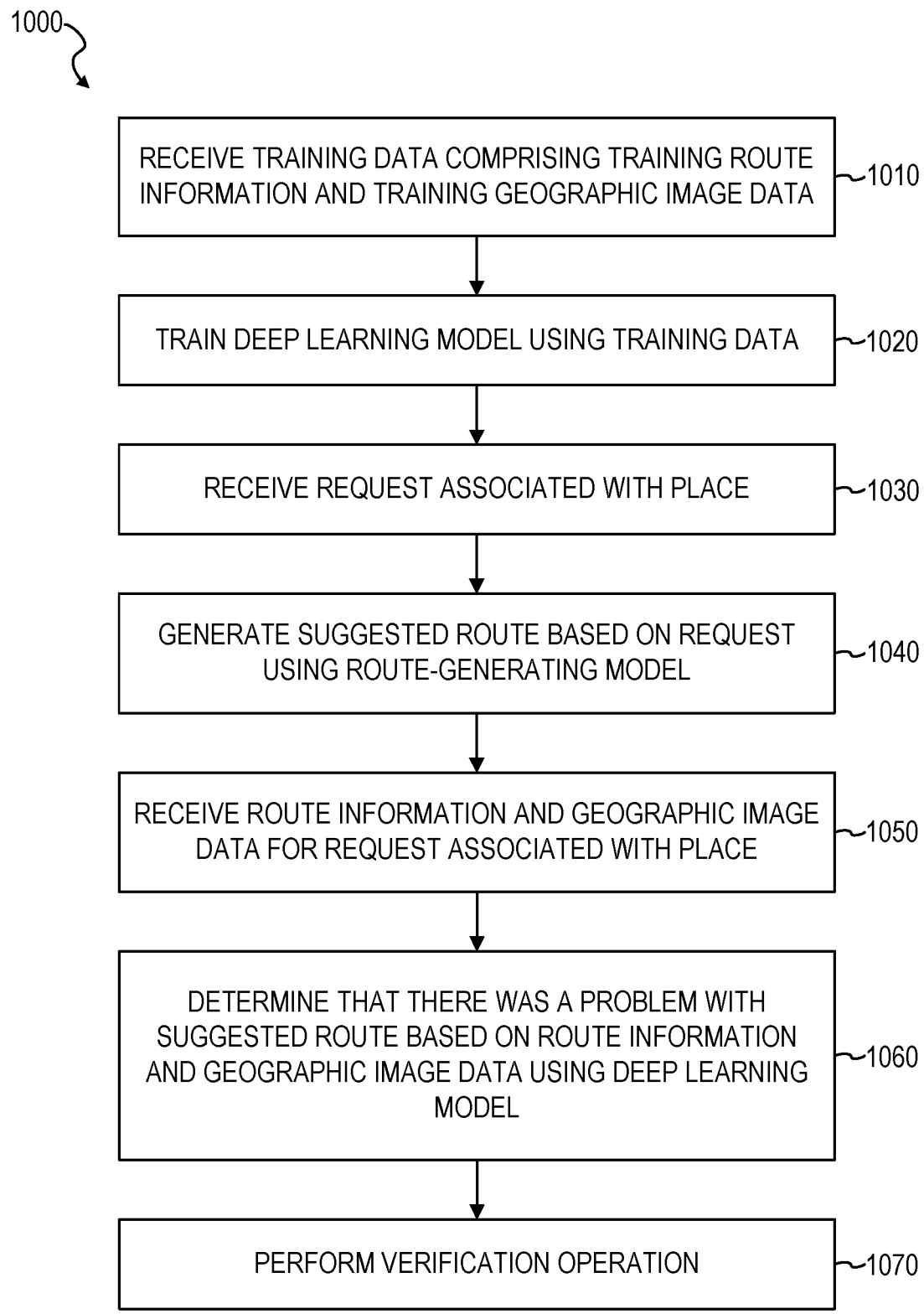
FIG. 10 is a flowchart illustrating a method of identifying a problem with a suggested route for a place using sensor data and satellite imagery, in accordance with some example embodiments.

FIG. 10 is a flowchart illustrating a method 1000 of identifying a problem with a suggested route for a place using sensor data and satellite imagery, in accordance with some example embodiments. The method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the networked computer system 100 of FIG. 1, or any combination of one or more of its components or modules (e.g., prediction module 102, service module 104), as described above.

At operation 1010, the prediction module 102 receives a plurality of training data, with each one of the plurality of training data comprising training route information and training geographic image data for the training route information. Each training route information corresponds to a servicing of a request associated with a place and indicates a travelled route that has been traveled by a user in traveling from an origin location to the place. Each training geographic image data represents a geographic area corresponding to the travelled route. A portion of the plurality of training data is labeled, or otherwise identified, as indicating that a suggested route used in the servicing of a request is incorrect, and a remaining portion of the plurality of training data is labeled, or otherwise identified, as indicating that a suggested route used in the servicing of a request is not incorrect.

At operation 1020, the prediction module 102 trains a second deep learning model using the plurality of training data. In some example embodiments, the second deep learning model comprises a convolutional neural network. However, other types of deep learning models are also within the scope of the present disclosure.

At operation 1030, the service module 104 receives a request associated with a place, such as discussed above with respect to FIG. 1. At operation 1040, the service module 104 generates a suggested route based on the request using a route-generating model, such as discussed above with respect to FIG. 1.

At operation 1050, the prediction module 102 receives route information and geographic image data. The route information corresponds to a servicing of the request associated with the place and indicates a travelled route that has been traveled by a user in traveling from an origin location to the place, and the geographic image data represents a geographic area corresponding to the travelled route. In some example embodiments, the geographic image data comprises satellite image data. However, other types of geographic image data are also within the scope of the present disclosure. In some example embodiments, the route information comprises a visual indication of the travelled route, and the receiving the route information and the geographic image data comprises receiving an image file comprising the visual indication of the travelled route superimposed onto the geographic image data. In some example embodiments, the indication of the travelled route comprises a single continuous line. In some example embodiments, the indication of the travelled route comprises a series of separate points.

At operation 1060, the prediction module 102 determines that there was a problem with the suggested route based on the route information and the geographic image data using the trained second deep learning model.

At operation 1070, the prediction module 102 performs a verification operation based on the determination at operation 1060 that there was a problem with the suggested route. In some example embodiments, the verification operation comprises causing a notification to be displayed on a computing device, with the notification indicating that there was a problem with the suggested route. In some example embodiments, the verification operation comprises modifying the route-generating model. In some example embodiments, the verification operation comprises causing a communication to be displayed in a computing device of the user, the communication prompting the user to confirm whether there was a problem in the servicing of the request associated with the place.

It is contemplated that any of the other features described within the present disclosure can be incorporated into the method 1000.

It is contemplated that any features of any embodiments disclosed herein can be combined with any other features of any other embodiments disclosed herein. Accordingly, any such hybrid embodiments are within the scope of the present disclosure.

Example Mobile Device

Figure 11:
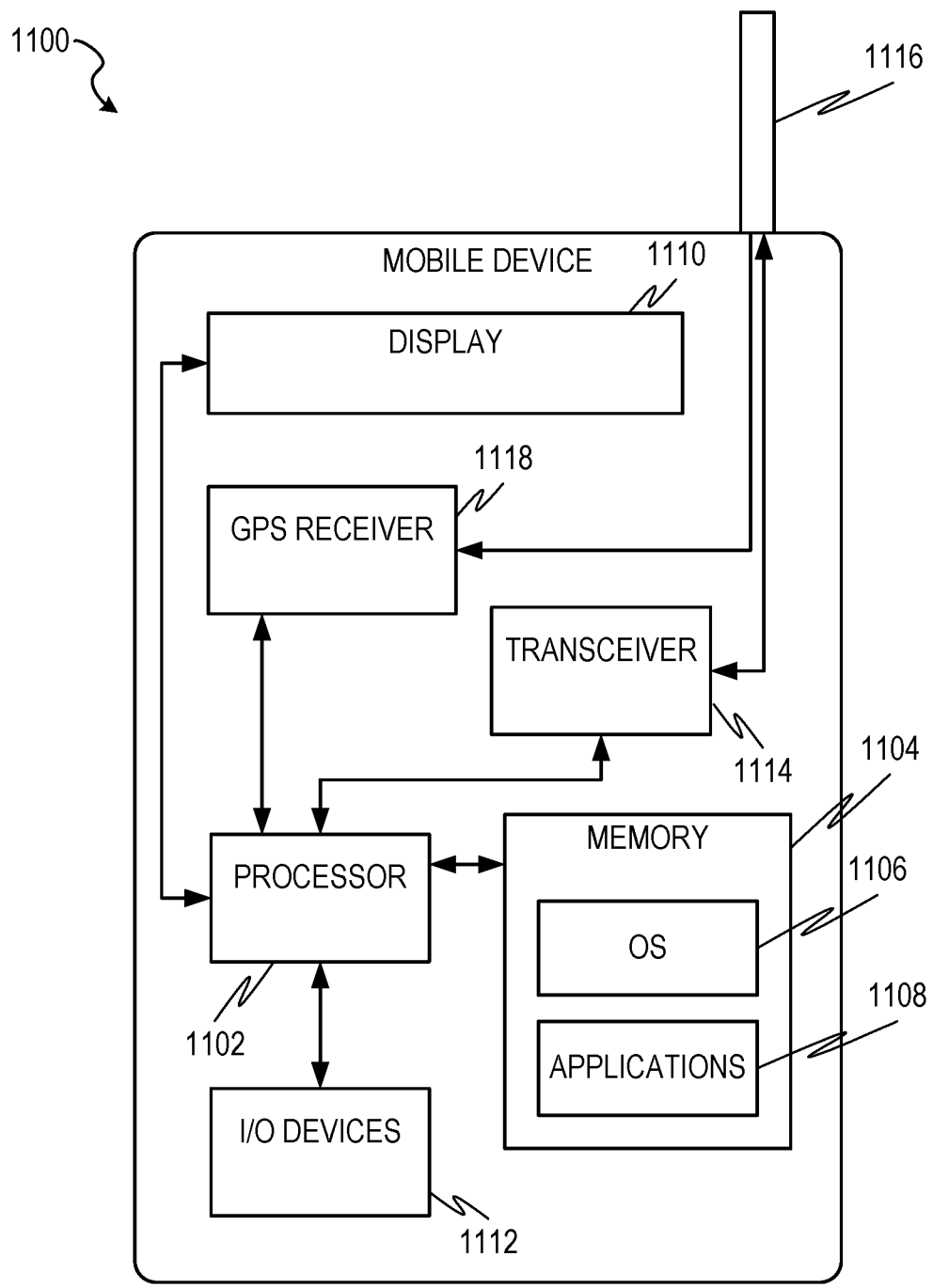
FIG. 11 is a block diagram illustrating a mobile device, in accordance with some example embodiments.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or another type of memory, is typically accessible to the processor 1102. The memory 1104 can be adapted to store an operating system (OS) 1106, as well as application programs 1108, such as a mobile location-enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Programming Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
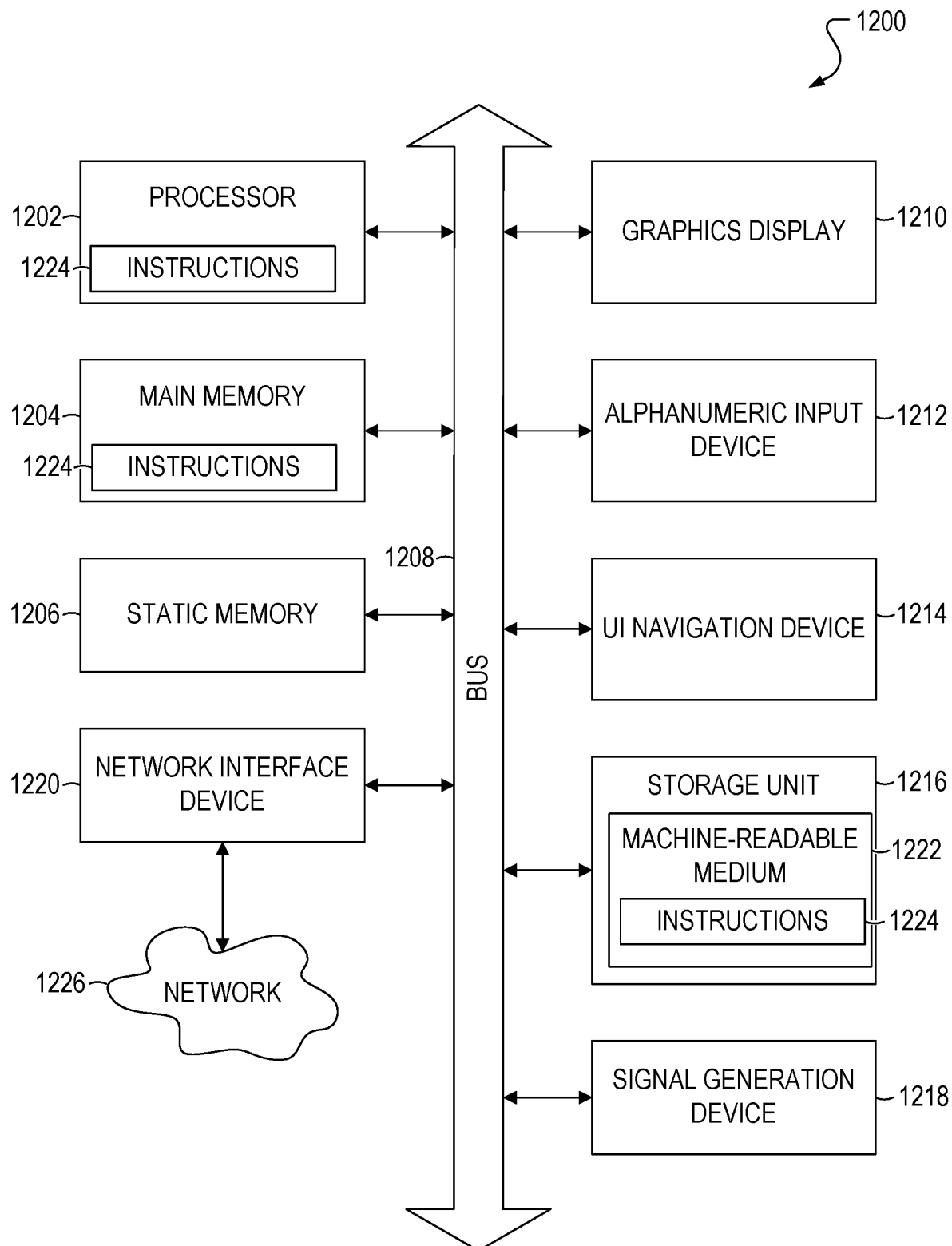
FIG. 12 is a diagrammatic representation of a machine in the form of a computer system within which a set of instructions may be executed for causing the machine to perform any one or more of the methodologies discussed herein, according to an example embodiment.

FIG. 12 is a block diagram of an example computer system 1200 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a graphics display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a storage unit 1216, a signal generation device 1218 (e.g., a speaker) and a network interface device 1220.

Machine-Readable Medium

The storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions (e.g., instructions 1224) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Executable Instructions and Machine-Storage Medium

The various memories (i.e., 1204, 1206, and/or memory of the processor(s) 1202) and/or storage unit 1216 may store one or more sets of instructions and data structures (e.g., software) 1224 embodying or utilized by any one or more of the methodologies or functions described herein. These instructions, when executed by processor(s) 1202 cause various operations to implement the disclosed embodiments.

As used herein, the terms "machine-storage medium," "device-storage medium," "computer-storage medium" (referred to collectively as "machine-storage medium 1222") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1222 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1222 specifically exclude carrier waves, modulated data signals, and other such media, at least some of which are covered under the term "signal medium" discussed below.

Signal Medium

The term "signal medium" or "transmission medium" in this disclosure shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

Numbered Examples of Embodiments

The following numbered examples are embodiments.

1. A computer-implemented method comprising:
receiving, by a computer system having at least one hardware processor, route information and geographic image data, the route information corresponding to a servicing of a request associated with a place and indicating a travelled route that has been traveled by a user in traveling from an origin location to the place, and the geographic image data representing a geographic area corresponding to the travelled route;
determining, by the computer system, that an initial geographic location stored in a database in association with the place is incorrect based on the route information and the geographic image data using a first deep learning model; and
performing, by the computer system, a verification operation based on the determining that the stored initial geographic location of the place is incorrect.

2. The computer-implemented method of example 1, wherein the geographic image data comprises satellite image data.

3. The computer implemented method of example 1 or example 2, wherein the route information comprises a visual indication of the travelled route, and the receiving the route information and the geographic image data comprises receiving an image file comprising the visual indication of the travelled route superimposed onto the geographic image data.

4. The computer-implemented method of example 3, wherein the visual indication of the travelled route comprises a single continuous line.

5. The computer-implemented method of example 3, wherein the visual indication of the travelled route comprises a series of separate points.

6. The computer-implemented method of any one of examples 1 to 5, wherein the first deep learning model comprises a convolutional neural network.

7. The computer-implemented method of any one of examples 1 to 6, further comprising:
receiving, by the computer system, a plurality of training data, each one of the plurality of training data comprising training route information and training geographic image data for the training route information, the training route information corresponding to another servicing of another request associated with another place and indicating another travelled route that has been traveled by another user in traveling from another origin location to the other place, and the training geographic image data representing another geographic area corresponding to the other travelled route, a portion of the plurality of training data being identified as indicating that another initial geographic location stored in the database in association with the other place is incorrect, and a remaining portion of the plurality of training data being identified as indicating that another initial geographic location stored in the database in association with the other place is not incorrect; and training, by the computer system, the first deep learning model using the plurality of training data.

8. The computer-implemented method of any one of examples 1 to 7, wherein the performing the verification operation comprises causing a notification to be displayed on a computing device, the notification indicating that the initial geographic location stored in association with the place in the database is incorrect.

9. The computer-implemented method of any one of examples 1 to 8, wherein the performing the verification operation comprises:

generating a new geographic location for the place using corresponding service data for each one of a plurality of requests for a transportation service associated with the place, the transportation service comprising transportation of a requester of the request to or from the place, the corresponding service data indicating the new geographic location for the place; and storing, by the computer system, the new geographic location in a database in association with the place.

10. The computer-implemented method of any one of examples 1 to 9, wherein the performing the verification operation comprises causing a communication to be displayed in a computing device of the user, the communication prompting the user to confirm whether there was a problem in the servicing of the request associated with the place.

11. The computer-implemented method of any one of examples 1 to 10, further comprising:

receiving, by the computer system, the request associated with the place;

generating, by the computer system, a suggested route based on the request using a route-generating model;

determining, by the computer system, that there was a problem with the suggested route based on the route information and the geographic image data using a second deep learning model; and performing, by the computer system, another verification operation based on the determining that there was a problem with the suggested route.

12. The computer-implemented method of example 11, wherein the second deep learning model comprises a convolutional neural network.

13. The computer-implemented method of example 11 or example 12, wherein the performing the other verification operation comprises causing a notification to be displayed on a computing device, the notification indicating that there was a problem with the suggested route.

14. The computer-implemented method of any one of examples 11 to 13, wherein the performing the other verification operation comprises modifying the route-generating model.

15. The computer-implemented method of any one of examples 11 to 14, wherein the performing the other verification operation comprises causing a communication to be displayed in a computing device of the user, the communication prompting the user to confirm whether there was a problem in the servicing of the request associated with the place.

16. A system comprising:
at least one hardware processor; and
a machine-readable medium embodying a set of instructions that, when executed by the at least one hardware processor, cause the at least one hardware processor to perform the method of any one of examples 1 to 15.

17. A machine-readable medium embodying a set of instructions that, when executed by at least one hardware processor, cause the at least one hardware processor to perform the method of any one of examples 1 to 15.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
receiving, by a computer system having at least one hardware processor, route information and geographic image data, the route information corresponding to a servicing of a request associated with a place and indicating a travelled route that has been traveled by a user in traveling from an origin location to the place, the travelled route starting at the origin location and ending at the place, and the geographic image data representing a geographic area corresponding to the travelled route;

determining, by the computer system, that an initial geographic location stored in a database in association with the place is incorrect based on the route information and the geographic image data using a first deep learning model;

performing, by the computer system, a verification operation based on the determining that the stored initial geographic location of the place is incorrect;

receiving, by the computer system, a plurality of training data, each one of the plurality of training data comprising training route information and training geographic image data for the training route information, the training route information corresponding to another servicing of another request associated with another place and indicating another travelled route that has been traveled by another user in traveling from another origin location to the other place, and the training geographic image data representing another geographic area corresponding to the other travelled route, a portion of the plurality of training data being identified as indicating that another initial geographic location stored in the database in association with the other place is incorrect, and a remaining portion of the plurality of training data being identified as indicating that another initial geographic location stored in the database in association with the other place is correct; and training, by the computer system, the first deep learning model using the plurality of training data.

2. The computer-implemented method of claim 1, wherein the geographic image data comprises satellite image data.

3. The computer-implemented method of claim 1, wherein the route information comprises a visual indication of the travelled route, and the receiving the route information and the geographic image data comprises receiving an image file comprising the visual indication of the travelled route superimposed onto the geographic image data.

4. The computer-implemented method of claim 3, wherein the visual indication of the travelled route comprises a single continuous line.

5. The computer-implemented method of claim 3, wherein the visual indication of the travelled route comprises a series of separate points.

6. The computer-implemented method of claim 1, wherein the first deep learning model comprises a convolutional neural network.

7. The computer-implemented method of claim 1, wherein the performing the verification operation comprises causing a notification to be displayed on a computing device, the notification indicating that the initial geographic location stored in association with the place in the database is incorrect.

8. The computer-implemented method of claim 1, wherein the performing the verification operation comprises:

generating a new geographic location for the place using corresponding service data for each one of a plurality of requests for a transportation service associated with the place, the transportation service comprising transportation of a requester of the request to or from the place, the corresponding service data indicating the new geographic location for the place; and storing, by the computer system, the new geographic location in a database in association with the place.

9. The computer-implemented method of claim 1, wherein the performing the verification operation comprises causing a communication to be displayed in a computing device of the user, the communication prompting the user to confirm whether there was a problem in the servicing of the request associated with the place.

10. The computer-implemented method of claim 1, further comprising:

receiving, by the computer system, the request associated with the place;

generating, by the computer system, a suggested route based on the request using a route-generating model;

determining, by the computer system, that there was a problem with the suggested route based on the route information and the geographic image data using a second deep learning model; and performing, by the computer system, another verification operation based on the determining that there was a problem with the suggested route.

11. The computer-implemented method of claim 10, wherein the second deep learning model comprises a convolutional neural network.

12. The computer-implemented method of claim 10, wherein the performing the other verification operation comprises causing a notification to be displayed on a computing device, the notification indicating that there was a problem with the suggested route.

13. The computer-implemented method of claim 10, wherein the performing the other verification operation comprises modifying the route-generating model.

14. The computer-implemented method of claim 10, wherein the performing the other verification operation comprises causing a communication to be displayed in a computing device of the user, the communication prompting the user to confirm whether there was a problem in the servicing of the request associated with the place.

15. A system comprising:

at least one hardware processor; and a non-transitory machine-readable medium embodying a set of instructions that, when executed by the at least one hardware processor, cause the at least one hardware processor to perform operations, the operations comprising:

receiving route information and geographic image data, the route information corresponding to a servicing of a request associated with a place and indicating a travelled route that has been traveled by a user in traveling from an origin location to the place, the travelled route starting at the origin location and ending at the place, and the geographic image data representing a geographic area corresponding to the travelled route;

determining that an initial geographic location stored in a database in association with the place is incorrect based on the route information and the geographic image data using a first deep learning model;

performing a verification operation based on the determining that the stored initial geographic location of the place is incorrect;

receiving a plurality of training data, each one of the plurality of training data comprising training route information and training geographic image data for the training route information, the training route information corresponding to another servicing of another request associated with another place and indicating another travelled route that has been traveled by another user in traveling from another origin location to the other place, and the training geographic image data representing another geographic area corresponding to the other travelled route, a portion of the plurality of training data being identified as indicating that another initial geographic location stored in the database in association with the other place is incorrect, and a remaining portion of the plurality of training data being identified as indicating that another initial geographic location stored in the database in association with the other place is correct; and training the first deep learning model using the plurality of training data.

16. The system of claim 15, wherein the route information comprises a visual indication of the travelled route, and the receiving the route information and the geographic image data comprises receiving an image file comprising the visual indication of the travelled route superimposed onto the geographic image data.

17. The system of claim 15, wherein the performing the verification operation comprises causing a notification to be displayed on a computing device, the notification indicating that the initial geographic location stored in association with the place in the database is incorrect.

18. The system of claim 15, wherein the performing the verification operation comprises:
  generating a new geographic location for the place using corresponding service data for each one of a plurality of requests for a transportation service associated with the place, the transportation service comprising transportation of a requester of the request to or from the place, the corresponding service data indicating the new geographic location for the place; and
  storing, by the computer system, the new geographic location in a database in association with the place.

19. A non-transitory machine-readable medium embodying a set of instructions that, when executed by at least one hardware processor, cause the at least one hardware processor to perform operations, the operations comprising:
  receiving route information and geographic image data, the route information corresponding to a servicing of a request associated with a place and indicating a travelled route that has been traveled by a user in traveling from an origin location to the place, the travelled route starting at the origin location and ending at the place, and the geographic image data representing a geographic area corresponding to the travelled route;
  determining that an initial geographic location stored in a database in association with the place is incorrect based on the route information and the geographic image data using a first deep learning model;
  performing a verification operation based on the determining that the stored initial geographic location of the place is incorrect; and
  receiving a plurality of training data, each one of the plurality of training data comprising training route information and training geographic image data for the training route information, the training route information corresponding to another servicing of another request associated with another place and indicating another travelled route that has been traveled by another user in traveling from another origin location to the other place, and the training geographic image data representing another geographic area corresponding to the other travelled route a portion of the plurality of training data being identified as indicating that another initial geographic location stored in the database in association with the other place is incorrect, and a remaining portion of the plurality of training data being identified as indicating that another initial geographic location stored in the database in association with the other place is correct; and
  training the first deep learning model using the plurality of training data.

* * * * *

UNITED STATES PATENT AND TRADEMARK OFFICE
CERTIFICATE OF CORRECTION

| | | |
|---|---|---|
| PATENT NO. | : 10,955,251 B2 | Page 1 of 1 |
| APPLICATION NO. | : 16/123656 | |
| DATED | : March 23, 2021 | |
| INVENTOR(S) | : Sheth et al. | |

It is certified that error appears in the above-identified patent and that said Letters Patent is hereby corrected as shown below:

In the Claims

In Column 28, Line 21, in Claim 19, delete "route" and insert --route,-- therefor Signed and Sealed this
Seventeenth Day of August, 2021

Drew Hirshfeld
*Performing the Functions and Duties of the
Under Secretary of Commerce for Intellectual Property and
Director of the United States Patent and Trademark Office*